(12) United States Patent
Chang

(10) Patent No.: US 8,281,778 B2
(45) Date of Patent: Oct. 9, 2012

(54) VENTING SYSTEM FOR A STOVE

(75) Inventor: Freddie Chang, Arcadia, CA (US)

(73) Assignee: Afire Inc., Evanston, IL (US)

( * ) Notice: Subject to any disclaimer, the term of this patent is extended or adjusted under 35 U.S.C. 154(b) by 213 days.

(21) Appl. No.: 12/699,806

(22) Filed: Feb. 3, 2010

(65) Prior Publication Data

US 2011/0073097 A1    Mar. 31, 2011

(30) Foreign Application Priority Data

Sep. 25, 2009 (TW) ............................... 98217790 U

(51) Int. Cl.
*A47J 37/07* (2006.01)
(52) U.S. Cl. .......... 126/15 R; 126/21 R; 126/77; 126/80
(58) Field of Classification Search ................ 126/15 R, 126/21 R, 77, 80, 25 A, 25 AA
See application file for complete search history.

(56) References Cited

U.S. PATENT DOCUMENTS 4,788,962 A * 12/1988 Mashburn et al. .......... 126/25 R

* cited by examiner

*Primary Examiner* — Alfred Basichas

(57) ABSTRACT

A venting system for a stove includes a screen disposed beneath a bottom opening of the stove and an elevation means for adjusting a height of the screen so as to enable the screen to selectively move close to or away from the bottom opening. More specifically, the elevation means includes a main body and an adjuster, and the screen includes an elevator. The main body has a fixation portion and a connecting portion. The fixation portion is fixed to a bottom of the stove, and the adjuster is movably connected to the connecting portion. The elevator and the adjuster are in a motional operative relationship. As such, the elevator can be elevated, by the adjuster to selectively move close to or away from the bottom opening.

11 Claims, 7 Drawing Sheets

VENTING SYSTEM FOR A STOVE

BACKGROUND OF THE INVENTION

1. Field of the Invention

The present invention relates to a venting system for a stove, and more particularly to a venting system disposed beneath the stove to control the air flow of a bottom opening of the stove.

2. Description of the Prior Art

Most of the conventional stoves for BBQ use solid fuel, such as charcoal, as a source for supplying a fire. Comparing to liquid or gaseous fuel, the burning rate of the solid feel is harder to be controlled. A common way to adjust the burning rate thereof is to control the air flow rate of the venting opening of the stove, so as to provide the stove with a desired heat.

A conventional method to control the air flow rate is as disclosed in U.S. Pat. No. 6,349,713, which provides an air supply window (7) and a door (7a) that selectively open or close the window (7) to adjust the air flow rate thereof.

Another method to control the air flow rate is as disclosed in U.S. Pat No. 4,416,248 and U.S. Pat. No. 4,777,927, which provide several elongated slots on a bottom of the stove and several arms. The arms are mainly used to push the ash toward the elongated slots. Nevertheless, the arms can also selectively envelope the slots, thus the air flow rate of the slots can still be controlled.

Generally speaking, the afore-mentioned methods to control the air flow rate substantially include a horizontally operable object to selectively envelope the opening of the stove. On the other hand, the present invention focuses on providing another method to control the air flow rate.

SUMMARY OF THE INVENTION

The main object of the present invention is to provide a venting system that controls the air flow rate by adjusting an elevator to selectively move close to or away from a bottom opening of a stove.

To achieve the above object, a venting system for a stove is provided. The venting system includes a screen and an elevation means. The screen is disposed beneath a bottom opening, and the elevation means is for adjusting a height of the screen so as to enable the screen to selectively move close to or away from the bottom opening. More specifically, the elevation means includes a main body and an adjuster, and the screen includes an elevator. The main body has a fixation portion and a connecting portion. The fixation portion is fixed to a bottom of the stove, and the adjuster is movably connected to the connecting portion. The elevator and the adjuster are in a motional operative relationship, so that the elevator is movably by the adjuster to selectively move close to or away front the bottom opening. As such, the air flow rate of the bottom opening is controllable to further control the burning rate of the fuel in the stove.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENTS

Figure 1:
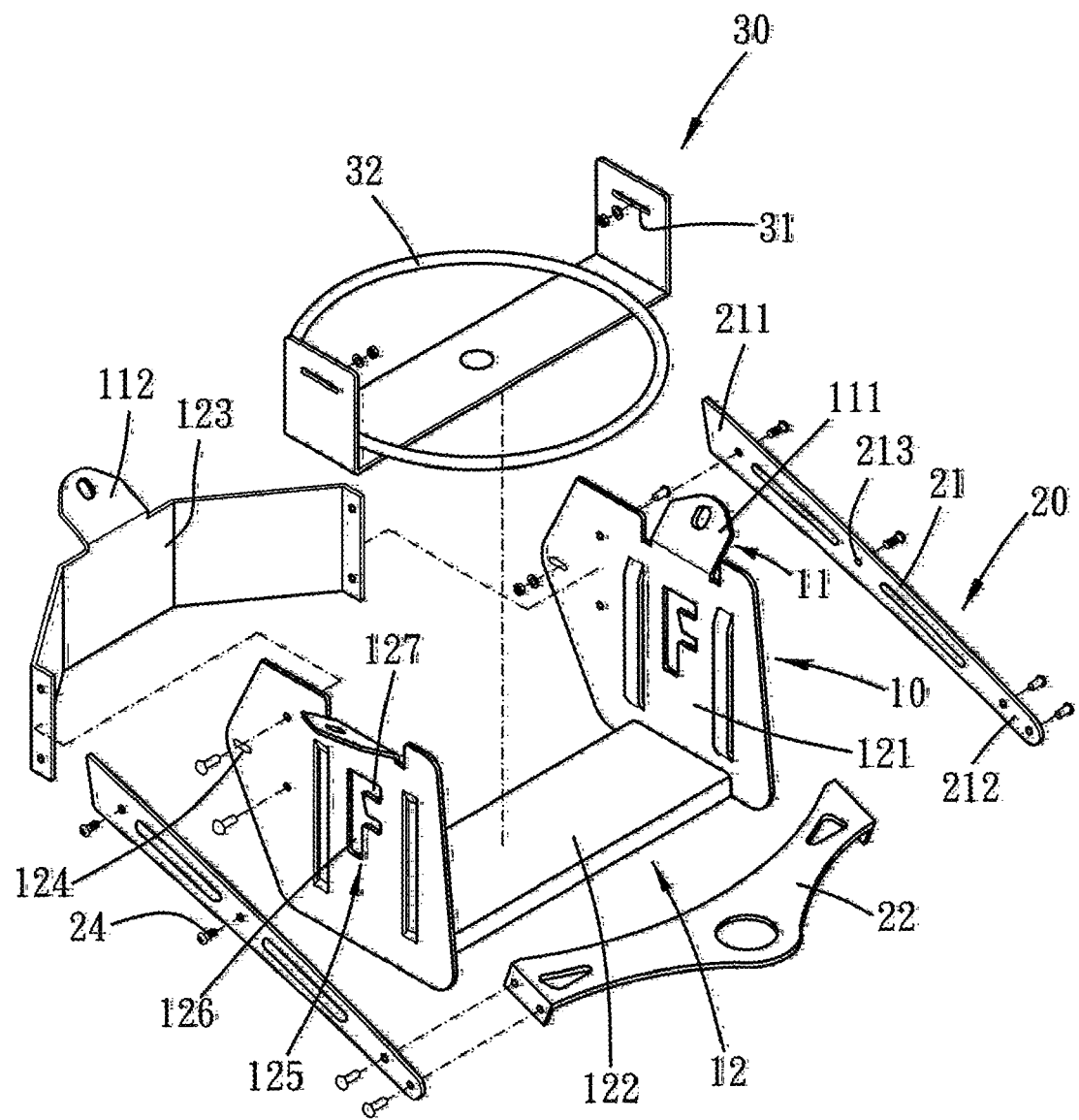
FIG. 1 is a breakdown drawing showing a venting system of the present invention.
Figure 2:
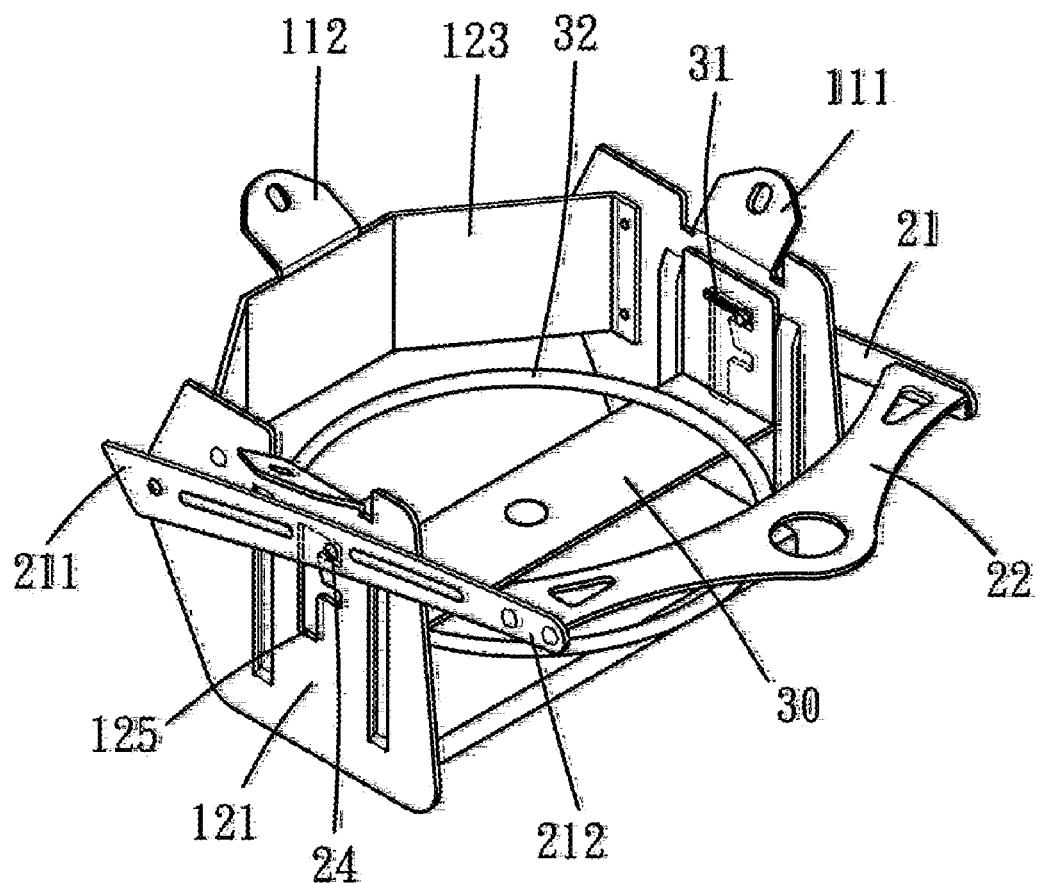
FIG. 2 is a combination drawing showing a vesting system of the present invention.

Please refer to FIG. 1 to FIG. 4 for a preferred embodiment of the present invention. A venting system for a stove includes a main body 10, an adjuster 20 and an elevator 30. The venting system is disposed beneath the stove, which has a bottom opening disposed on a bottom thereof. The stove defines a burning room for solid fuel, such as charcoal, to burn therein, and at least a part of the air, i.e. the oxygen, needed to burn the charcoal flows into the burning room via the bottom opening. Whereby, heat generated by burning the charcoal can be used to cook food in a suitable manner such as roasting, stewing, frying, boiling or sauteing.

The main body 10 has a fixation portion 11 and a connecting portion 12. The fixation portion 11 is fixed to the bottom of the stove. Specifically, the connecting portion 12 includes two opposite connecting plates 121. A bridge plate 122 bridges between bottom sides of the connecting plates 121, and a surrounding plate 123 bridges between front sides of the connecting plates 121. The fixation portion 11 includes two opposite fixation plates 111 and am auxiliary fixation plate 112. The fixation plates 111 are respectively disposed on upper sides of the connecting plates 121, and the auxiliary fixation plate 112 is disposed on an upper side of the surrounding plate 123. The fixation plates 111 and 112 are fixed to the bottom of the stove by threaded means or other fixation means. Moreover, each connecting plate 121 has a pivoting bore 124 and a guiding rail element 125. In the present embodiment, the pivoting bore 124 is I-shaped and transversely disposed. The guiding rail element 125 includes a vertical rail 126 substantially vertically disposed and at least one lateral rail 127 substantially transversely disposed. The vertical and lateral rails 126 and 127 communicate with each other. In the present embodiment, the guiding rail element 125 has two parallel arranged lateral rails 127, such that the guiding rail element 125 of the present embodiment is substantially F-shaped.

The adjuster 20 is movably connected to the connecting portion 12. The adjuster 20 includes two opposite pivoting rods 21, each of which has a first end 211 and a second end 212. The first end 211 of each pivoting rod 21 pivots the pivoting bore 124 of its corresponding connecting plate 121. Due to the pivoting bore 124 being I-shaped, the first end 211 of each pivot rod 21 is transversely slidable along its corresponding pivoting bore 124. Furthermore, the second ends 212 of the pivoting rods 21 are bridged by an operation portion 22. The operation portion 22 is preferably operated by the user to pivot the pivoting rods 21 about the pivoting bores 124. In addition, each pivoting rod 21 has a guiding bore 213 disposed between the first and second ends 211 and 212. Two guiding pins 24 respectively insert in one of the guiding bores 213 and its corresponding guiding rail element 125 to confine the travel of the pivotable adjuster 20.

Figure 3:
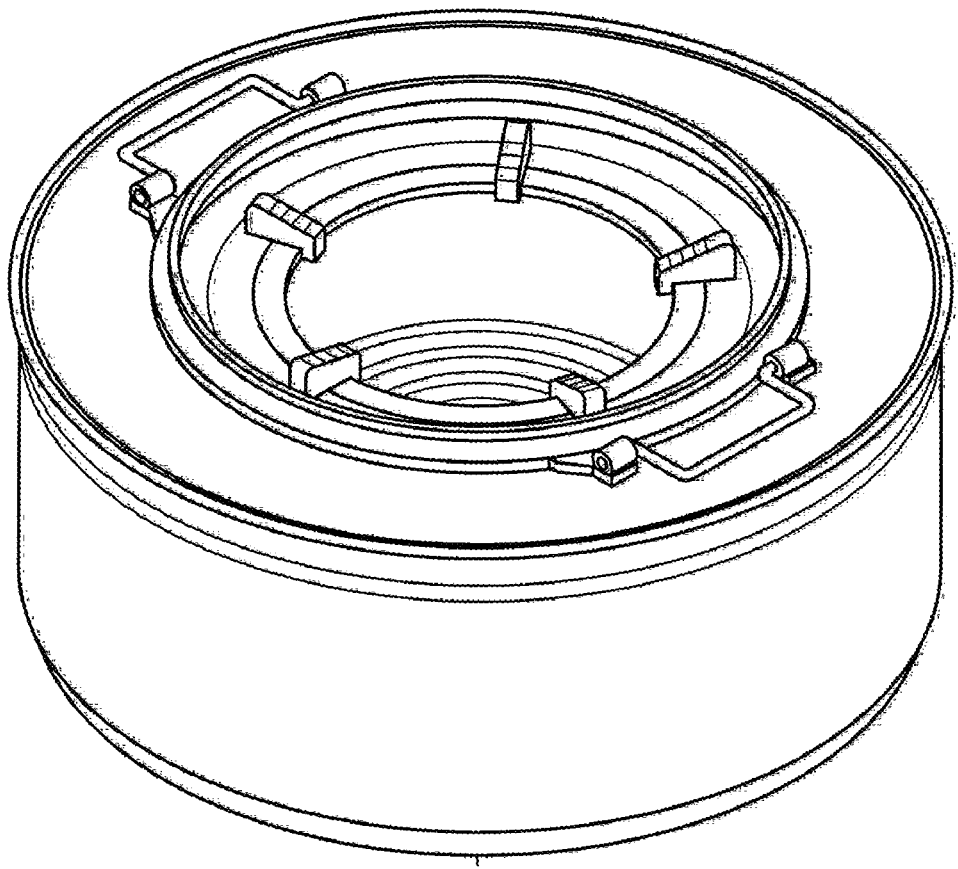
FIG. 3 is a breakdown drawing showing a stove and a venting system of the present invention.
Figure 4:
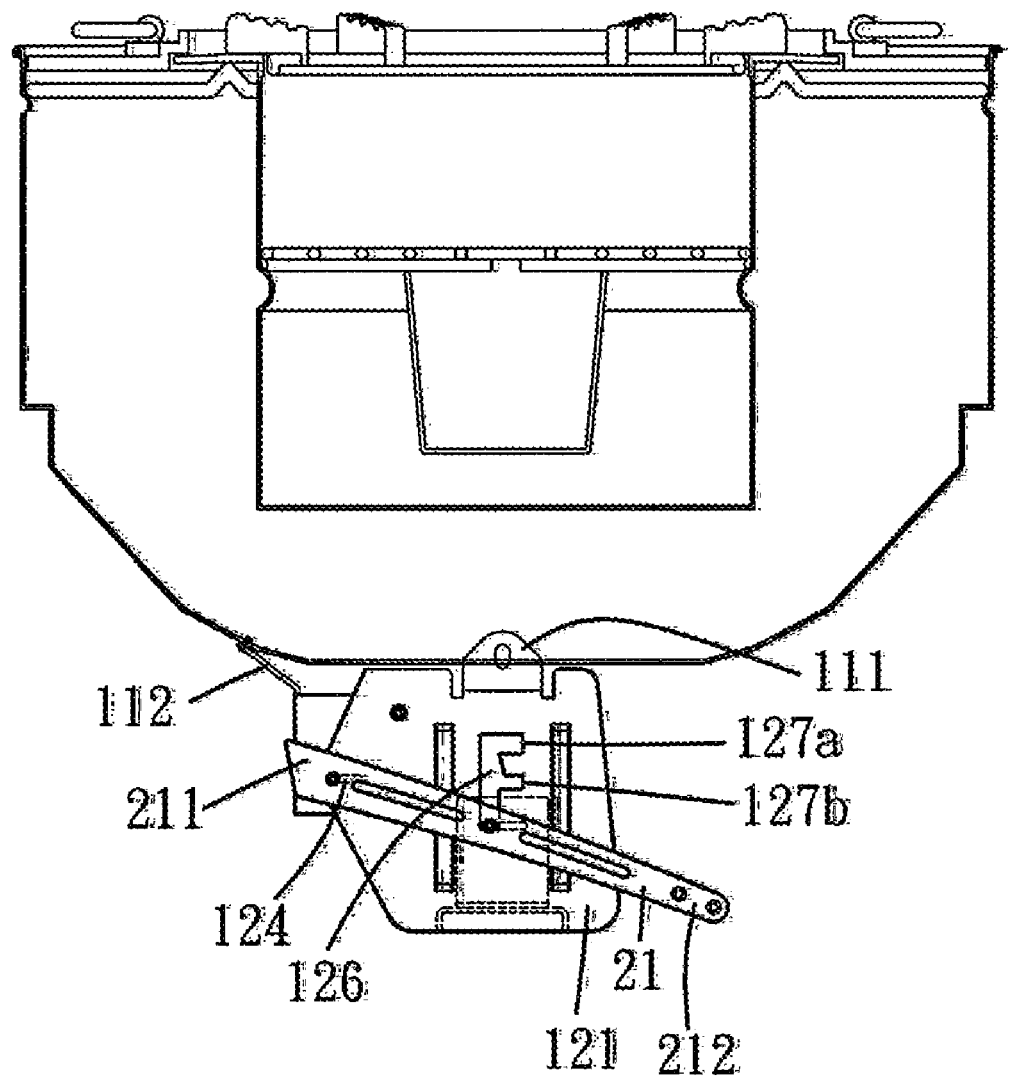
FIG. 4 is a profile showing a stove and a venting system of the present invention.
Figure 5:
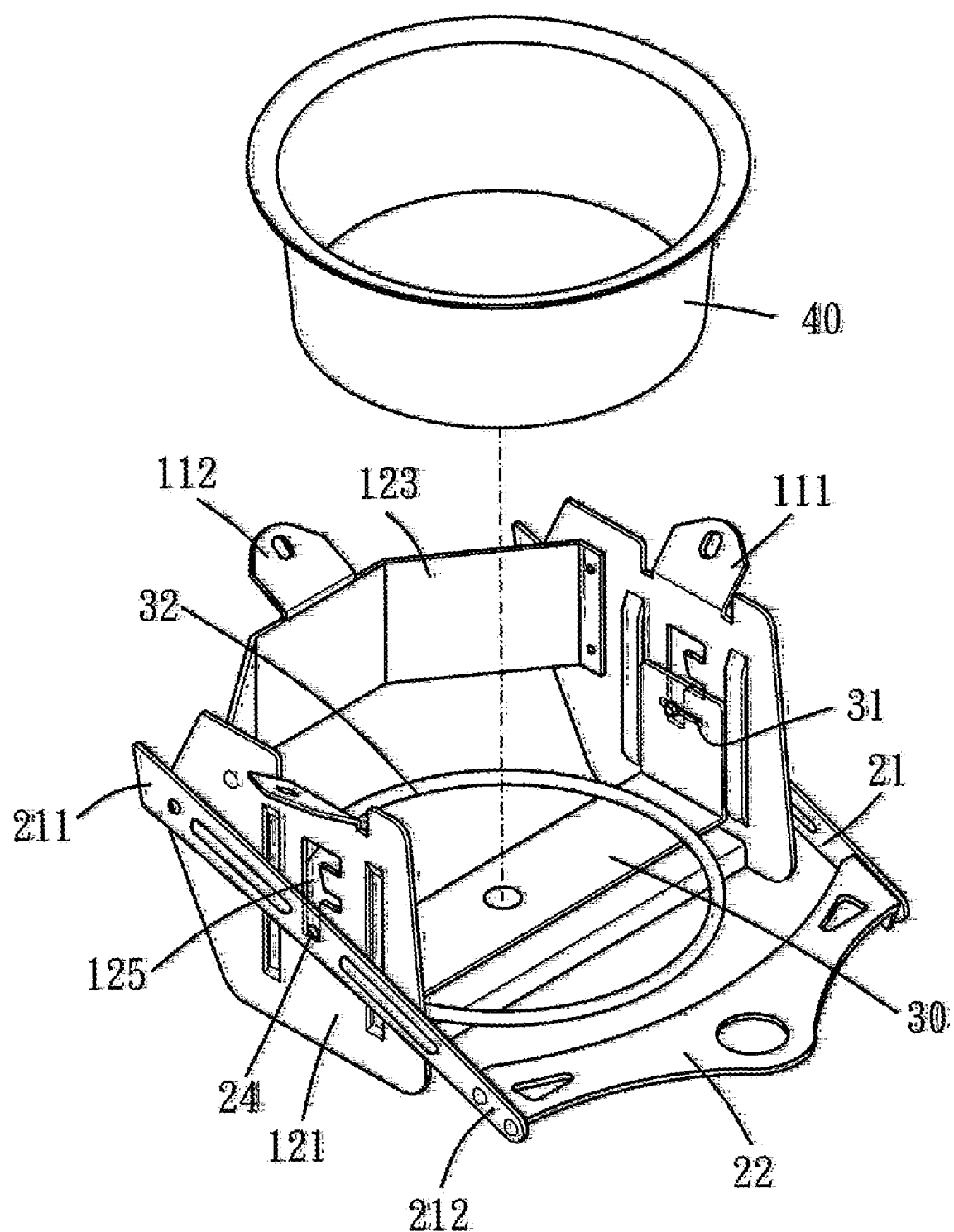
FIG. 5 is a breakdown drawing showing a venting system with a tub of the present invention.

The elevator 30 is disposed under the bottom opening. The elevator 30 and the adjuster 20 are in a motional operative relationship, so that the elevator 30 is movable by the adjuster 20 to selectively move close to or away from the bottom opening. Thereby, the air flow rate of the bottom opening is adjustable to control the burning rate of the solid fuel. More specifically, the elevator 30 is substantially U-shaped, and the guiding pins 24 respectively connect to two ends of the elevator 30. Preferably, two longitudinal slots 31 are respectively transversely disposed on the ends of the elevator 30, and the guiding pins 24 respectively insert in one of the guiding bores 213, its corresponding guiding rail element 125 and its corresponding longitudinal slot 31. As such, the guiding pins 24 are transversely slidable in the slots 31 and can move back and forth with respect to the elevator 30. Besides the elevator 30, the screen may further includes a tub 40, as shown in FIG. 3 or FIG. 5, so as to receive the ash or other object fallen from the stove. In addition, the tub 40 further increases the airflow-confining efficiencies of the screen significantly. To position the tub 40, a positioning ring 32 can be disposed on the elevator 30 to surround the tub 40, preventing the tub 40 from inadvertently falling.

Figure 6:
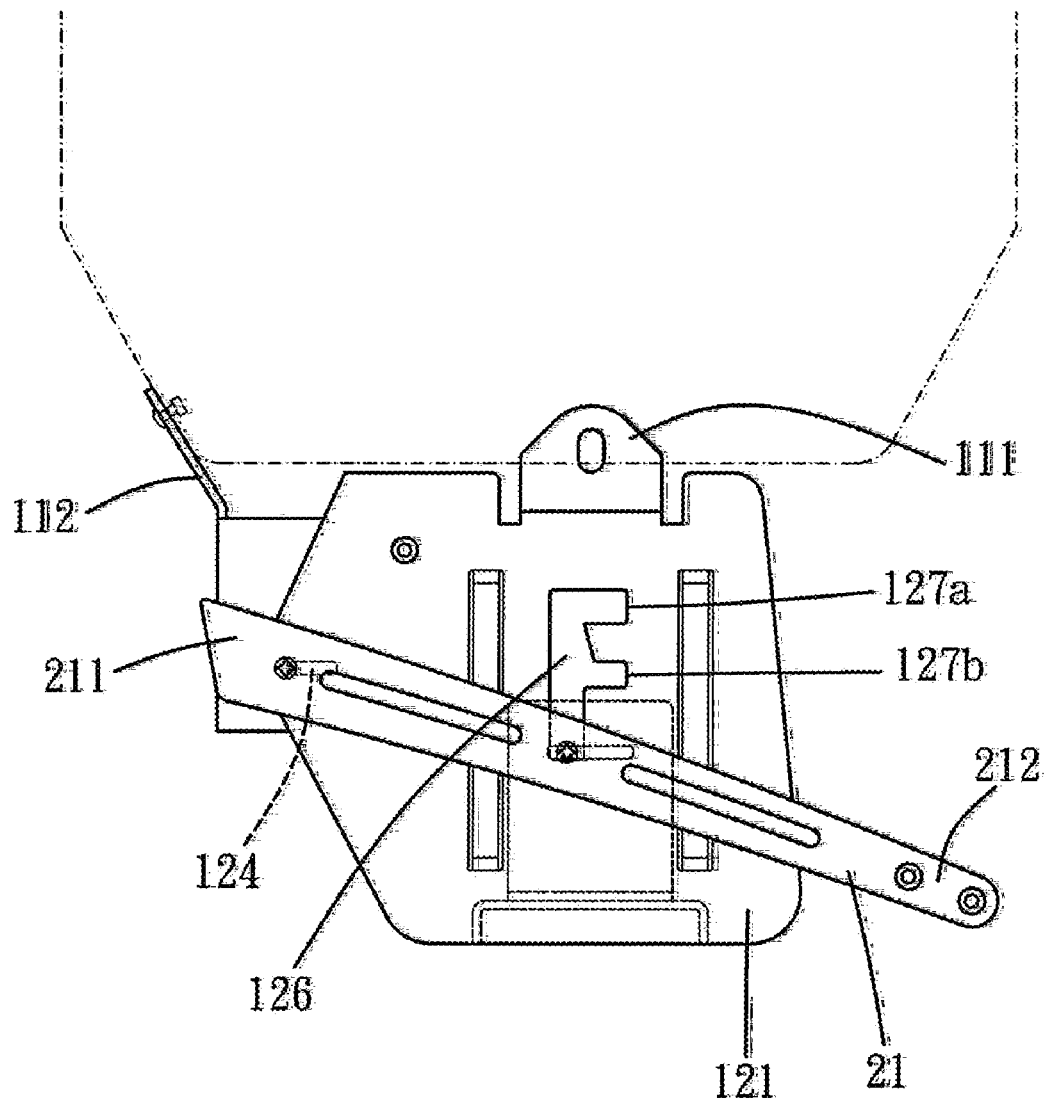
FIG. 6 is a side view showing an operation state (1) of the present invention.

The follows are descriptions of how to operate the venting system and its working principle. When the guiding pins 24 locates at the bottom ends of the vertical rails 126 as shown in FIG. 6, the distance between the elevator 30 (as well as the tub disposed thereon) and the bottom opening is longer. Thus the air flow rate of the bottom opening is faster for the fuel in the stove to burn sufficiently and fiercely.

Figure 7:
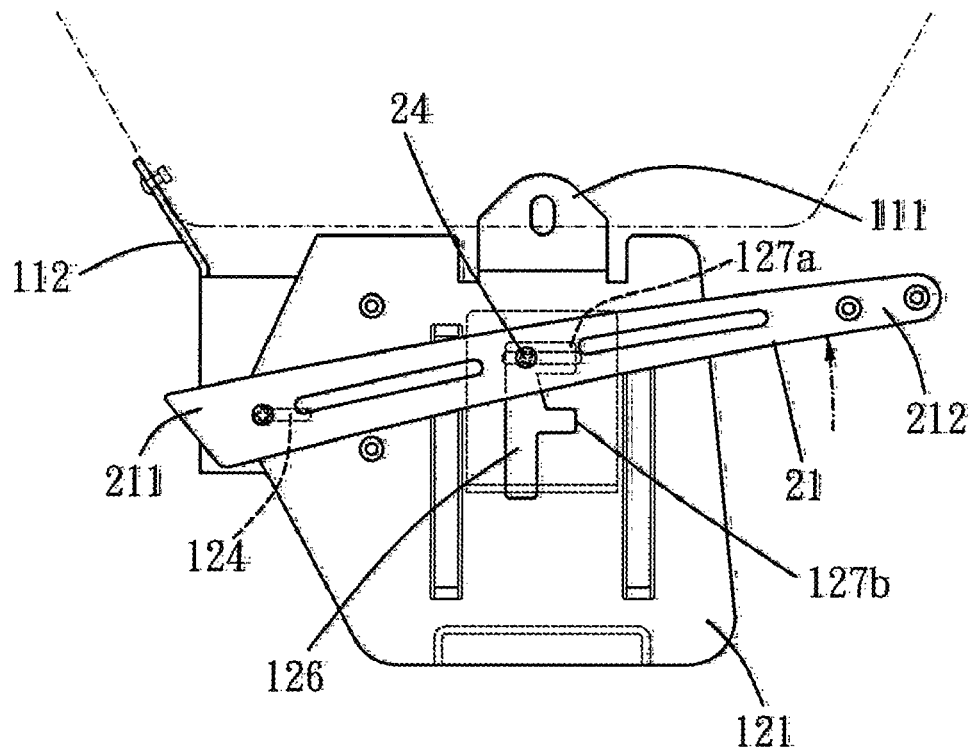
FIG. 7 is a side view showing an operation state (2) of the present invention.
Figure 8:
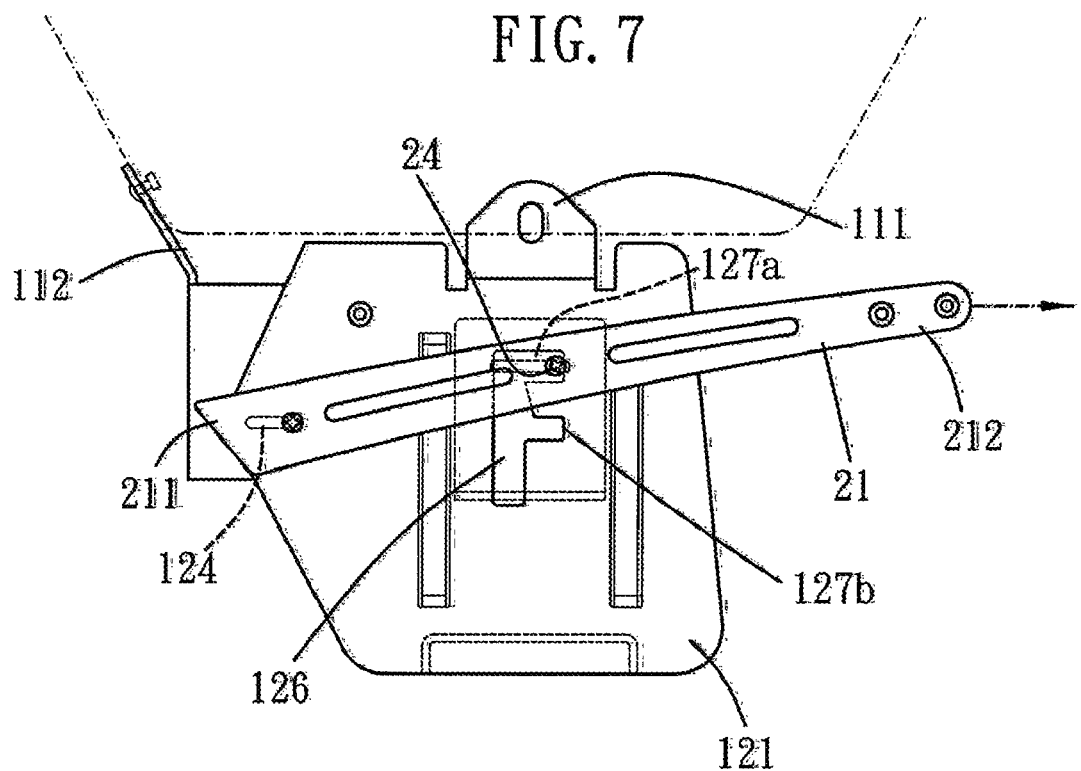
FIG. 8 is a side view showing an operation state (3) of the present invention.

When the user finds out that the heat provided by the stove is more than needed, the user simply needs to pull the operation portion 22 upward as shown in FIG. 7, locating the guiding pins 24 at the upper ends of the vertical rails 126. As such, the elevator 30 (as well as the tub disposed thereon) is very close to the bottom opening. Thereafter, the user pulls the operation portion 22 horizontally to locate the guiding pins 24 in the lateral rails 127a as shown in FIG. 8, positioning the adjuster 20 at such desired height. As a result, the flow rate of the air flowing into the stove via the bottom opening is significantly confined, and the fuel in the stove lacks sufficient oxygen to burn and lowers its burning rate. Likewise, the user can operate the operation portion 22 to locate the guiding pins 24 in the lateral rails 127b. In this case, the air flow rate is smaller than that as the pins 24 locates at the bottom ends of the vertical rails 126 but bigger than that as the pins 24 locates in the lateral rails 127a.

In the afore-mentioned embodiment, the guiding rail element 125 has two lateral rails and is substantially F-shaped. However, the amount of lateral rails is adjustable as desired, e.g., the guiding rail element 125 may have more than two lateral rails and provides multi-stage operation function. Note that the vertical rail may be slightly arc-shaped to correspond to the travel of the pivotable adjuster.

What is claimed is:

1. A venting system for a stove having a bottom opening where the venting system is disposed, comprising:

a screen, disposed beneath the bottom opening;

an elevation means for adjusting a height of the screen so as to enable the screen to selectively move close to or away from the bottom opening, the elevation means comprising a main body and an adjuster, the main body having a fixation portion and a connecting portion, the fixation portion is fixed to a bottom of the stove, the adjuster movably connected to the connecting portion;

wherein the screen comprises an elevator, the elevator and the adjuster are in a motional operative relationship, the elevator is movable by the adjuster to selectively move close to or away from the bottom opening;

wherein the adjuster comprises two opposite pivoting rods, each of which has a first end and a second end, the first end of each pivoting rod pivots the connecting portion of the main body, and the second ends of the pivoting rods are bridged by an operation portion.

2. The venting system of claim 1, wherein the screen further comprises a tub disposed atop the elevator.

3. The venting system of claim 1, wherein the connecting portion comprises two opposite connecting plates, and the fixation portion comprises two opposite fixation plates, the fixation plates are respectively disposed on upper sides of the connecting plates, each connecting plate has a pivoting bore and a guiding rail element, the first end of each pivoting rod pivot one of the pivoting bores, each guiding rail element comprises a vertical rail, which is substantially vertically disposed, and at least one lateral rail, which is substantially transversely disposed, the vertical and lateral rails communicate with each other, each pivoting rod has a guiding bore disposed between the first and second ends, two guiding pins respectively insert in one of the guiding bores and its corresponding guiding rail element to confine a travel of the pivotable adjuster.

4. The venting system of claim 3, wherein a bridge plate bridges between bottom sides of the connecting plates.

5. The venting system of claim 3, wherein a surrounding plate bridges between front sides of the connecting plates, the front sides are away from the second end of each pivoting rod.

6. The venting system of claim 5, wherein the fixation portion further comprises an auxiliary fixation plate disposed on an upper side of the surrounding plate.

7. The venting system of claim 3, wherein the elevator is substantially U-shaped, the guiding pins respectively connect to two ends of the elevator.

8. The venting system of claim 7, wherein two longitudinal slots are respectively transversely disposed on the ends of the elevator, the guiding pins are slidably inserted in the longitudinal slots respectively.

9. The venting system of claim 3, wherein the vertical rails are slightly arc-shaped to correspond to the travel of the pivotable adjuster.

10. The venting system of claim 3, wherein each guiding rail element has two lateral rails such that the guiding rail elements are substantially F-shaped.

11. The venting system of claim 3, wherein the pivoting bore of each connecting plate is I-shaped and transversely disposed for the first end of each pivot rod to be transversely slidably along its corresponding pivoting bore.

* * * * *